J. JOHNSON & J. H. YOUNGER.
HAY PRESS.
APPLICATION FILED JAN. 4, 1915.
1,159,948. Patented Nov. 9, 1915.
4 SHEETS—SHEET 1.
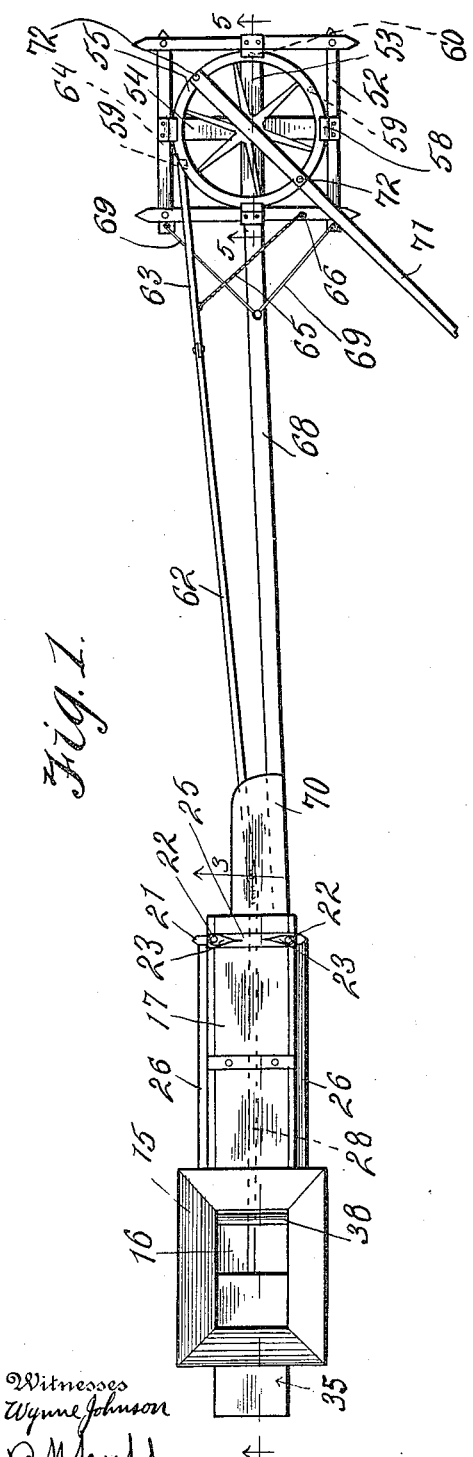
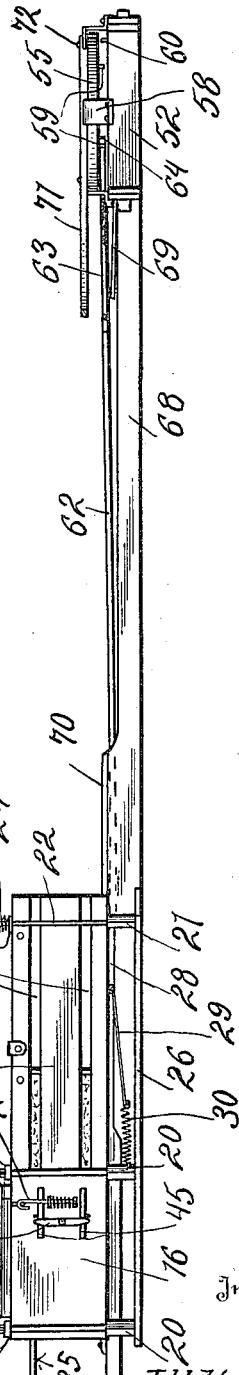

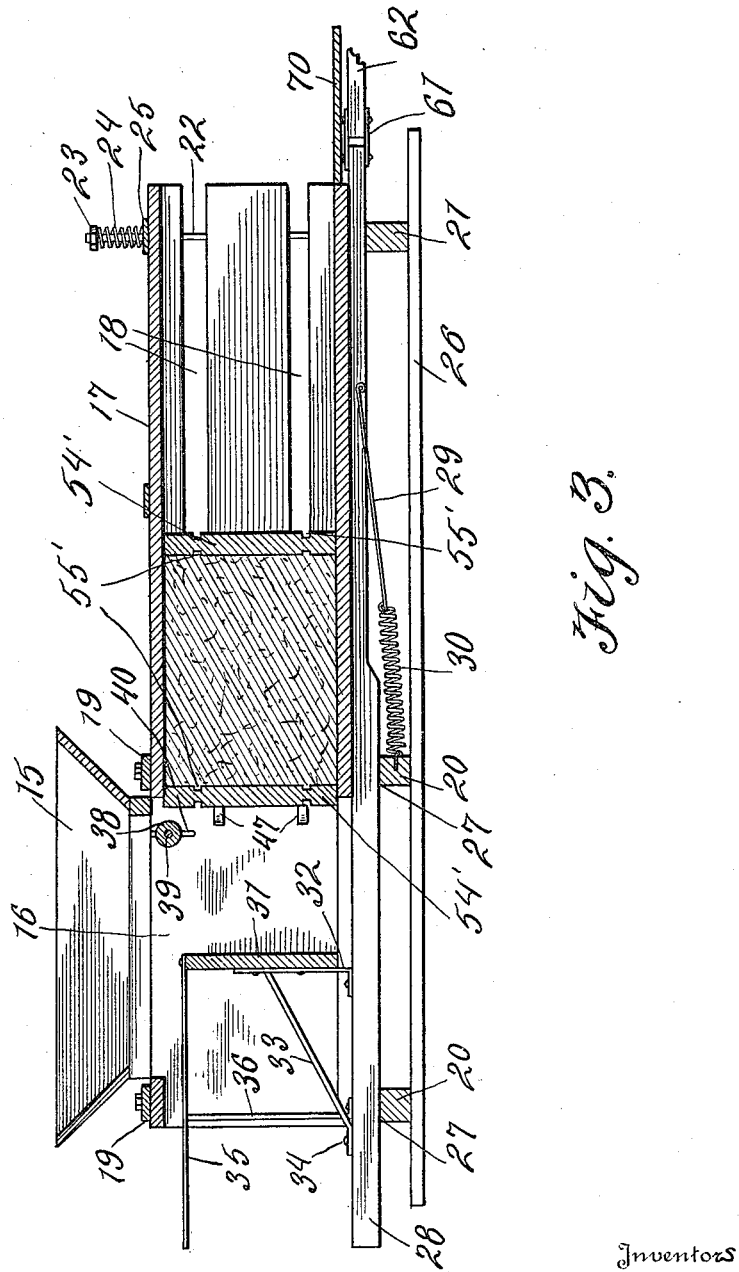

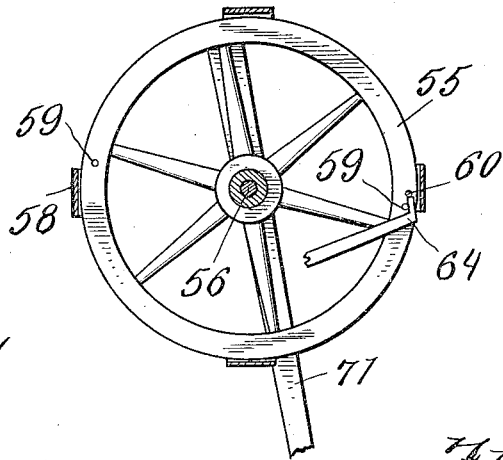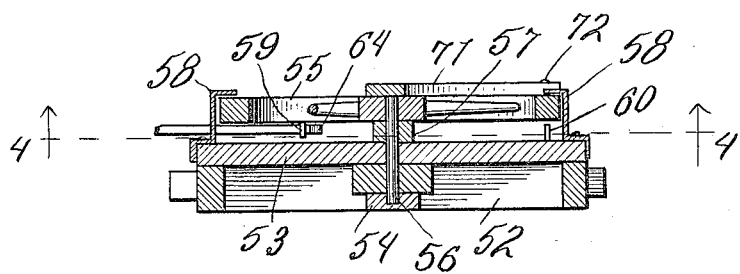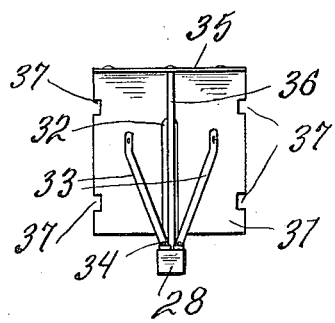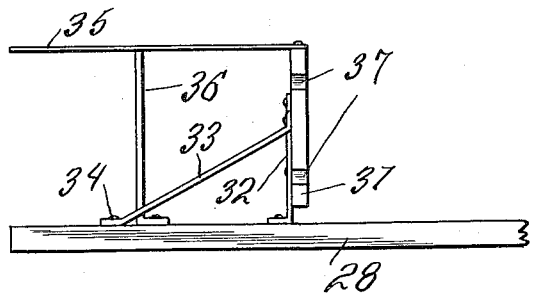

J. JOHNSON & J. H. YOUNGER.
HAY PRESS.
APPLICATION FILED JAN. 4, 1915.
1,159,948.
Patented Nov. 9, 1915.
4 SHEETS—SHEET 4.
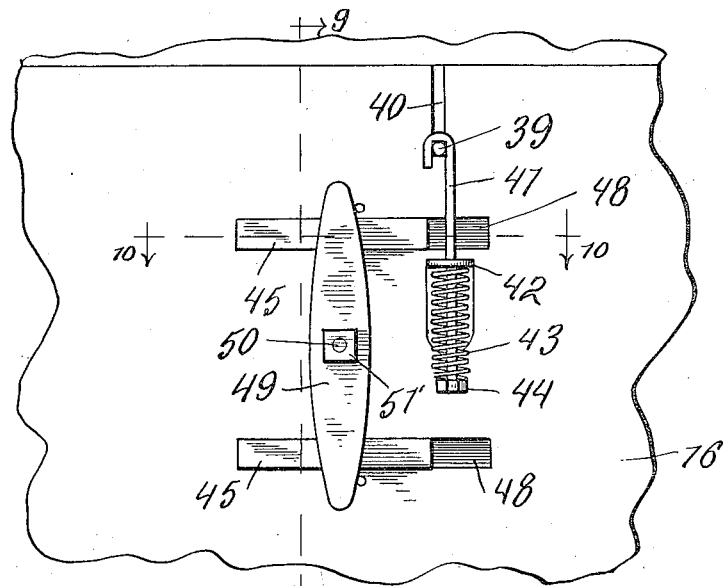
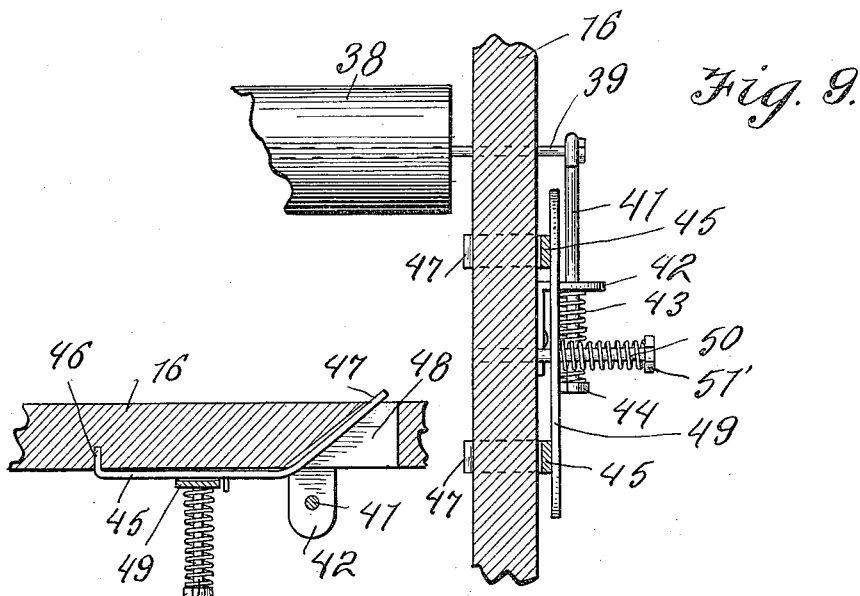

UNITED STATES PATENT OFFICE.

JONATHAN JOHNSON AND JAMES H. YOUNGER, OF MARCELLA, ARKANSAS.

HAY-PRESS.

1,159,948.

Specification of Letters Patent.

Patented Nov. 9, 1915.

Application filed January 4, 1915. Serial No. 436.

*To all whom it may concern:*

Be it known that we, JONATHAN JOHNSON and JAMES H. YOUNGER, citizens of the United States, residing at Marcella, in the county of Stone and State of Arkansas, have invented certain new and useful Improvements in Hay-Presses, of which the following is a specification.

Our invention relates to improvements in hay presses of the reciprocatory type.

An important object of the invention is to improve the construction of hay presses in general, rendering them simple in construction, inexpensive to manufacture, and expeditious and convenient in operation.

A further object of the invention is to provide extremely simple means for reciprocating the plunger.

A further object of the invention is to provide means to permit of slight yielding action of the baling chamber, preventing the bales from sticking therein, during the baling operation.

A further object of the invention is to provide novel and efficient means for folding the hay or other material, into the baling chamber, during the operation of the plunger, such means being adapted for use in connection with a plunger-apron, without choking the hay between the means and the plunger.

A further object of the invention is to provide a plunger which is simple in construction, strong and light.

Other objects and advantages of the invention will be apparent during the course of the following description.

In the accompanying drawings forming a part of this specification and in which like numerals are employed to designate like parts throughout the same, Figure 1 is a plan view of a hay press embodying our invention, Fig. 2 is a side elevation of the same, Fig. 3 is an enlarged central longitudinal sectional view through the baling chamber and associated elements, Fig. 4 is a horizontal sectional view through the means for reciprocating the plunger, taken on line 4—4 of Fig. 5 and looking upwardly as indicated by the arrows, Fig. 5 is a longitudinal sectional view taken on line 5—5 of Fig. 1, Fig. 6 is a side elevation of the plunger, Fig. 7 is an end elevation of the same, Fig. 8 is an enlarged fragmentary side elevation of the baling chamber, showing the means for retaining the folding roll in the lower position, together with associated elements, Fig. 9 is a vertical transverse section taken on line 9—9 of Fig. 8, and, Fig. 10 is a horizontal sectional view taken on line 10—10 of Fig. 8.

Attention being called first to Figs. 1, 2, and 3, the numeral 15 designates a hopper, to receive the hay or the like, the same discharging downwardly into the rear end 16 of a preferably horizontal baling chamber 17. This baling chamber is provided upon its vertical sides with spaced longitudinal openings or slots 18, passing through the forward end of the same and terminating near the forward end of the hopper 15, as shown. Surrounding the rear end of the baling chamber 17 adjacent the ends of the hopper 15 are rigid holding frames 19, embodying horizontal beams 20, disposed beneath the baling chamber. The longitudinal slots 18 render the forward portion or end of the baling chamber slightly vertically yieldable or elastic. Arranged beneath the forward end of the baling chamber 17 and rigidly attached thereto is a horizontal beam 21, carrying vertical rods 22, disposed upon opposite sides of the baling chamber, as shown. The upper ends of the rods 22 are screw-threaded, to receive adjusting levers or handles 23, engaging suitably stiff coil springs 24, surrounding the rods 22 and engaging a transverse strip 25, attached to the top of the baling chamber adjacent the forward end thereof and apertured to receive the rods 22. The function of the springs 24 is to yieldingly oppose the vertical expansion of the forward portion of the baling chamber, but allowing of proper slight expansion thereof, whereby the bale being completed or completed will not stick therein. By manipulation of the levers 23 the tension of the springs 24 may be varied. The horizontal beams 20 and 21 are attached to longitudinal beams or strips 26, which are in turn suitably attached to a foundation, not shown.

As more clearly shown in Fig. 3, the horizontal and transverse beams 20 and 21 are provided adjacent the baling chamber 17 with openings 27 to receive a longitudinal reciprocatory plunger-bar or plunger-rod 28. This plunger-bar has connection with a link 29, connected with one end of a retractile coil spring 30, the opposite end of which is attached to one of the transverse beams 20. The function of this spring is to automatically return the plunger-bar 28 to the rear position, when moved from this position and released, as will be more fully explained.

The numeral 31 (see Figs. 3, 6 and 7) designates a transverse vertical plunger, disposed within the rear end of the baling chamber above the plunger-bar 28. This plunger is of suitable size to fit snugly within the baling chamber to compress the hay or the like. The plunger 31 is spaced from the plunger-bar 28 and is connected therewith by a vertical strip or bar 32. Connected with the upper portion of the plunger 31 are diagonal reinforcing rods 33, the rear ends of which are attached to the plunger-bar 28 by means of a bolt 34 or the like. Attached to the upper end of the plunger 31 is a substantially horizontal apron 35, which serves to cut off the supply of hay to the lower portion of the baling chamber when the plunger is moving toward or has moved to the forward position. A vertical rod 36 is attached to the apron 35 between the ends thereof, and extends downwardly for connection with the plunger-bar 28, as shown. The plunger 31 is provided upon its vertical edges, as more clearly shown in Fig. 7, with horizontal grooves or openings 37, for a purpose to be described.

Disposed within the baling chamber 17 and adjacent the forward end of the hopper 15 is a vertically movable substantially horizontal rotatable folding-roller 38 carried by a transverse horizontal shaft 39, operating within elongated vertical slots 40. As more clearly shown in Fig. 8, each end of the shaft 39 is engaged by an upper hooked end of a vertical reciprocatory rod 41, operating within an apertured guide bracket 42, rigidly attached to the exterior of the baling chamber 17. A compressible and expansible coil spring 43 surrounds the lower portion of the rod 41, engages at its upper end with the bracket 42, and at its lower end with an adjustable nut 44 having screw-threaded engagement with the rod 41. As the hay entrapped in advance of the plunger 31 is moved forwardly therewith, the upper portion of the same engages with the rotatable folding-roller 38, which turns the same inwardly, prior to entering the rear end of the forward portion of the baling chamber, which action is rendered smooth by a slight vertical or yielding movement of the roller. In addition to this, if the roller could not yield vertically, the machine would be liable to be damaged by hay carried upon the forward end of the tray 35, which is not infrequently forced beneath the folding-roller upon the forward movement of the plunger whereby choking results. Arranged upon the exterior of the baling chamber 17, near and adjacent the rods 41, are check-pawls or dogs 45, one of which is clearly shown in Fig. 10. Each check-pawl or dog has its rear end bent laterally forming a hooked portion 46, extending into a recess formed upon the exterior of the baling chamber. The forward end of each check-pawl is bent laterally to provide a forwardly inclined holding finger 47, movably mounted through an opening 48, and adapted to project into the baling chamber for a substantial distance. Disposed upon each side of the rear portion of the baling chamber is a leaf spring 49, the ends of which engage with the pair of holding pawls 45. A bolt 50 is attached to each side of the baling chamber and passes through an aperture in the leaf spring 49 arranged between the ends thereof. A compressible coil spring 51 is carried by this bolt, the inner end thereof engaging the leaf spring 49, while its outer end engages an adjusting nut 51', whereby the tension of the springs 49 and 51 may be varied. The function of these check-pawls 45 is to engage the hay or the like upon the backward movement thereof, retarding or preventing such movement, the hay being carried under pressure forwardly of these pawls, as the plunger 31 is capable of moving past the ends of the pawls, such ends entering the grooves 37 of the plunger.

The numeral 54' designates transverse partitions, to be inserted within the baling chamber, at the ends of the bales to separate the same. The check-pawls prevent the backward movement of the transverse partitions 54'. These transverse partitions have grooves 55', upon their opposite faces, to register with the slots 18, whereby tie-wires may be passed about the bale, while in the baling chamber.

We will now proceed to describe the means which operates or reciprocates the plunger. As more clearly shown in Figs. 1, 2, 4 and 5, the numeral 52 designates a preferably rectangular base frame, to be rigidly attached to a suitable foundation. Arranged within this base frame and rigidly connected therewith are upper and lower crossing horizontal bars 53 and 54. Rotatably mounted upon the upper bar 53 is a horizontal wheel 55, secured thereto by means of a pin 56, and held spaced from the frame 52 by a ring 57 or the like. Attached to the frame 52 are guide brackets 58, slidably engaging the upper side of the felly of the wheel 55, preventing perceptible vertical movement thereof. Connected with the wheel 55 preferably at diametrically opposite points are operating elements or pins 59, which extend downwardly below the same for a substantial distance, as shown. Attached to the upper bar 53 is a stationary trip-pin 60, disposed slightly outwardly of the operating pins, when each operating pin is rotated into proximity thereto, as more clearly shown in Fig. 4.

Pivotally connected with the forward end of the rigid plunger-bar or rod 28, as shown at 61, (Fig. 3), is a rigid pitman 62, having a metallic extension or arm 63, rigidly attached thereto. At its forward end the extension 63 is provided with a laterally extending head 64, disposed at a right angle to the extension 63. The extension 63 is passed below the wheel 55, and the head 64 thereof is arranged in the path of travel of the depending pins 59, to be successively engaged thereby so that the pitman is carried forwardly, until the head 64 engages the trip-pin 60, which automatically causes this head to disengage the operating pin 59. The spring 30 will now return the plunger to the normal rear position, and effecting a corresponding movement of the pitman. Attached to the extension 63 is a flexible non-expansible element, such as a cable 65, the opposite end of which is attached to the frame 52 as shown at 66. This cable is attached to the frame 52 upon one side of the bracket 58, while the extension 63 is arranged upon the opposite side thereof. It is thus seen that the cable and extension will be angularly arranged whereby upon the rearward movement of the pitman 62, the same will exert a pull upon the cable, which will effect a lateral movement of the extension 63 toward the same, whereby the extension will be automatically returned to the normal position parallel with the axis of the baling chamber, and adjacent one side of the bracket 58, in which position it will be engaged by the successive operating pin 59. Instead of employing this relatively non-expansible element 65 it is obvious that a spring could be employed.

Arranged between the frame 52 and the baling chamber is a longitudinally extending spacing beam 68, the forward end of which may be connected to the frame 52, by any suitable means. Diagonal brace rods 69 afford additional connection between the frame 52 and the spacing beam 68. The rear end of the beam 68 is connected with the baling chamber by any suitable means, the same disposed upon one side of the pitman 62. Attached to this rear end of the beam 68 is a horizontal shield 70, covering the forward end of the pitman 62 and associated elements.

The wheel 55 may be rotated by any suitable means, but for the purpose of illustration we have shown the same as driven by a pole 71, attached thereto as shown at 72. This pole is to be rotated by horses, there being a suitable platform built over the operating parts of the press whereby the horses may travel thereover without injury to the same.

The operation of the hay press is as follows: The wheel 55 is continuously rotated at a suitable speed, whereby the operating pins 59 successively engage with the head 64 of the extension 63, causing a reciprocatory movement of the pitman 62. The movement of the pitman 62 is transmitted to the plunger-bar 28, which reciprocates the plunger 31. The plunger is positively moved forwardly, and returned by the spring 30. The hay is continuously fed into the hopper 56, and prior to the forward stroke of the plunger enters the baling chamber in advance of the same. Upon the power stroke of the plunger this hay is entrapped in advance of the plunger and forced into the forward portion of the baling chamber, additional hay being prevented from entering the lower portion of the baling chamber by the apron 35. The roller 38 folds the upper portion of the hay downwardly during its entrance into the forward portion of the baling chamber. The check-pawls 45 prevent back feeding of the hay. When a sufficient amount of hay has been fed into the forward portion of the baling chamber and compressed therein to complete a bale, a transverse partition 54' is passed into the forward portion of the baling chamber whereby a new bale is begun. The tie-wires are passed about each bale, subsequently to placing the partitions 54' upon the rear end thereof. In this manner, when the bale is detached from the forward end of the baling chamber, the same is complete.

It is to be understood that the form of our invention herewith shown and described is to be taken as a preferred example of the same, and that various changes in the shape, size, and arrangement of parts may be resorted to without departing from the spirit of the invention or the scope of the subjoined claims.

Having thus described our invention, we claim:—

1. A hay press comprising a baling chamber, a plunger mounted to reciprocate therein, a pitman connected with the plunger and provided with a laterally extending head, an operating wheel carrying an operating pin to engage with the laterally extending head to effect a movement of the pitman in one direction, and a relatively stationary trip-pin arranged in the path of travel of the laterally extending head carried by the operating pin to engage therewith and automatically move the same off of the operating pin.

2. In a hay press, a baling chamber, a plunger mounted to reciprocate therein, a wheel provided with an operating pin, a pitman connected with the plunger and provided with a laterally extending head to engage and disengage the operating pin, a relatively stationary trip-pin disposed in the path of travel of the laterally extending head carried by the operating pin to engage therewith and automatically move the same off of the operating pin, and a spring to automatically return the plunger to the normal starting position.

3. A hay press of the character described, comprising a baling chamber, a plunger mounted to reciprocate therein, a pitman pivotally connected with the plunger and provided near its free end with a lateral extension, a base arranged beneath the free end of the pitman, an operating wheel pivotally mounted upon the base and disposed above the free end of the pitman, guide elements secured to the base and slidably contacting with the upper side of the operating wheel, means to turn the operating wheel, a pin carried by the operating wheel and depending therefrom to detachably engage with the lateral extension, and a relatively stationary trip pin secured to the base and disposed in the path of travel of the lateral extension of the pitman.

In testimony whereof we affix our signatures in the presence of two witnesses.

JONATHAN JOHNSON.
JAMES H. YOUNGER.

Witnesses:
JOHN H. GRAY,
JAMES M. EVETTS.

Copies of this patent may be obtained for five cents each, by addressing the "Commissioner of Patents, Washington, D. C."